Feb. 14, 1956 W. M. ADKISSON 2,735,084

PULSE TYPE RECEIVER CIRCUITS

Filed Sept. 11, 1952 2 Sheets-Sheet 1

INVENTOR.
WILLIAM M. ADKISSON
BY George H. Fisher
ATTORNEY

Feb. 14, 1956 W. M. ADKISSON 2,735,084

PULSE TYPE RECEIVER CIRCUITS

Filed Sept. 11, 1952 2 Sheets-Sheet 2

INVENTOR.
WILLIAM M. ADKISSON
BY George H. Fisher
ATTORNEY

United States Patent Office 2,735,084

Patented Feb. 14, 1956

2,735,084

PULSE TYPE RECEIVER CIRCUITS

William M. Adkisson, Minneapolis, Minn., assignor to Minneapolis-Honeywell Regulator Company, Minneapolis, Minn., a corporation of Delaware Application September 11, 1952, Serial No. 309,055

19 Claims. (Cl. 340—167)

Figure 1:
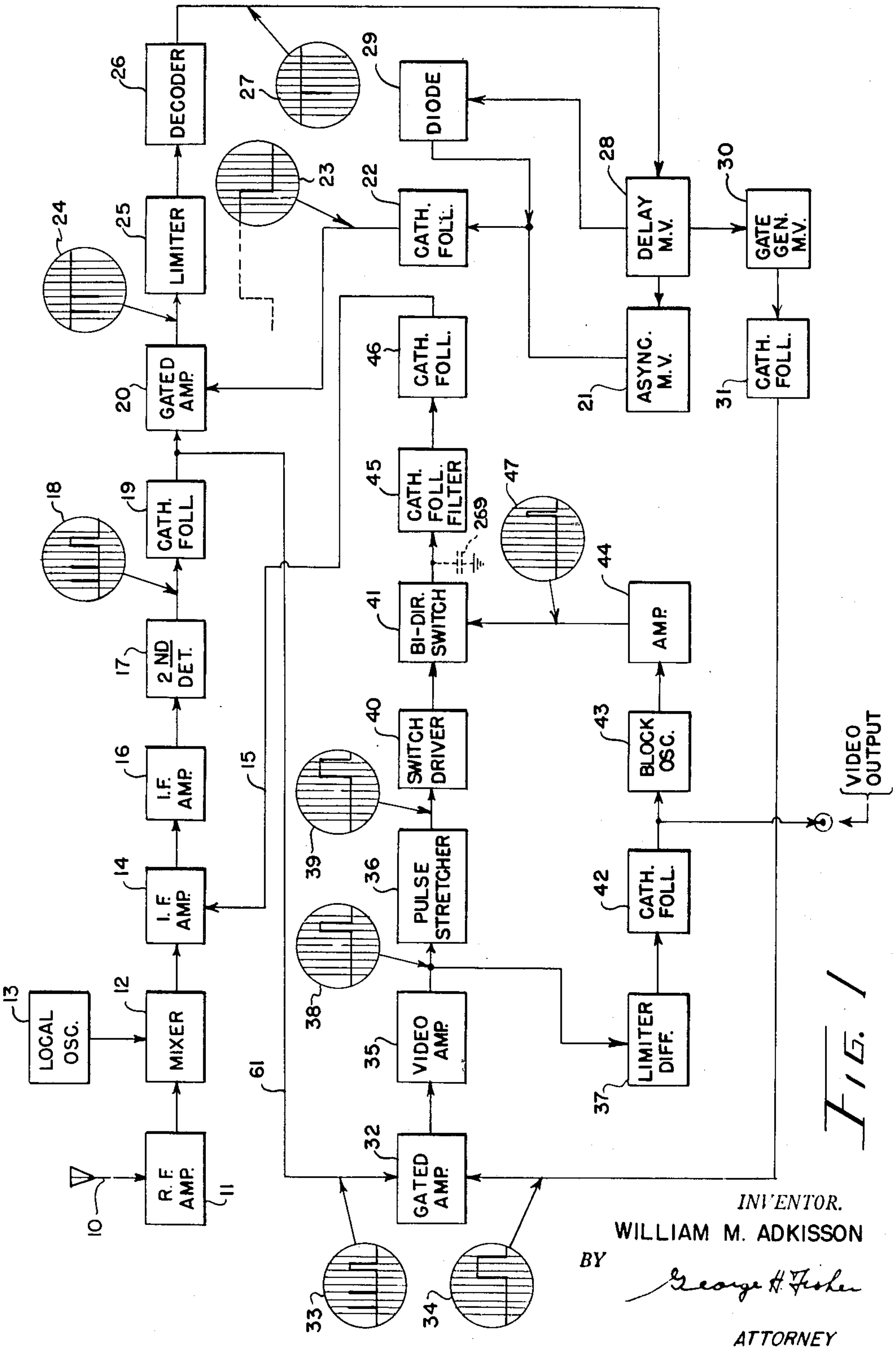

The present invention is concerned with the provision of a new and improved pulse type radio receiver. More particularly, the present invention is concerned with a receiver of electrical pulses of relatively short duration wherein it is desired to eliminate the effects upon the receiver and its output of spurious electrical signals originating either externally or internally of the receiver equipment, such spurious signals being normally referred to as "noise."

In present day radio receivers which are adapted to receive energy pulses of relatively short duration for control purposes it is often desirable that the range of operation of such receivers be maintained at as high a level as possible without interference from spurious electrical signals which may be present in the receiver or its associated circuits. It has been proposed that in such receivers some provision be made to insure that certain of the receiver circuits are operative only upon the happening of a predetermined event. Such an event may be determined by the received signal pulses which may be in the form of a group of coding pulses spaced at predetermined intervals followed by an intelligence pulse. The coding pulses may be used to effect operation of certain of the receiver circuits only during the time interval that the intelligence pulse is expected in the receiver and to maintain the receiver circuits ineffective at all other times. Such an arrangement eliminates the spurious or noise signals which may occur at other times and cause possible blocking or decrease in the efficiency of the receiver. If the efficiency of the receiver is lowered by spurious or noise signals, the effective range of operation of such a receiver is greatly decreased. In those portions of the receiver circuit wherein it is impossible to eliminate the noise that is present, it is desirable to eliminate the effects of the noise or maintain the effects of the noise at a minimum. It has been found that automatic gain control circuits are generally the portions of pulse type receivers most affected by spurious or noise signals. It has also been found desirable to provide for a decoding arrangement which will be operative regardless of the noise conditions and which will be effective to create appropriate gating pulses only upon the reception of the proper coding pulses.

It is therefore an object of the present invention to provide a new and improved pulse type receiver which minimizes the effects of spurious electrical signals or noise which may be present in the receiver.

A further object of the present invention is to provide a pulse type receiver having therein improved means for initiating operation of certain of the receiver circuits only during an interval when an inteligence signal is beng passed therethrough.

A further object of the present nvention is to provide a new and improved pulse type receiver wherein noise which cannot be eliminated from the receiver is not effective to lower the efficiency of operation of the receiver.

A still further object of the present invention is to provide a new and improved pulse type receiver which is arranged to receive a train of time coded pulse groups each comprising a plurality of coding pulses followed by an intelligence pulse, wherein the coding pulses are utilized to control a gating circuit for rendering certain of the receiver circuits operative during the occurence of the intelligence pulse.

Still another object of the present invention is to provide for a pulse type receiver having a decoding circuit for a time coded set of pulses which recurs at a predetermined frequency wherein a gating pulse train is produced which is at a frequency slightly different than the repetition frequency of said coded pulses and wherein upon occurrence of the gating pulse simultaneously with a group of coded pulses the gating pulse cycle is overridden to synchronize the gating pulse train with the coding pulse train.

Another object of the present invention is to provide a pulse type receiver circuit of the electronic type wherein spurious electrical signals and received intelligence pulses are maintained at an effectively constant relation regardless of the magnitude of the received pulse or the spurious or noise signals present.

Figure 2:
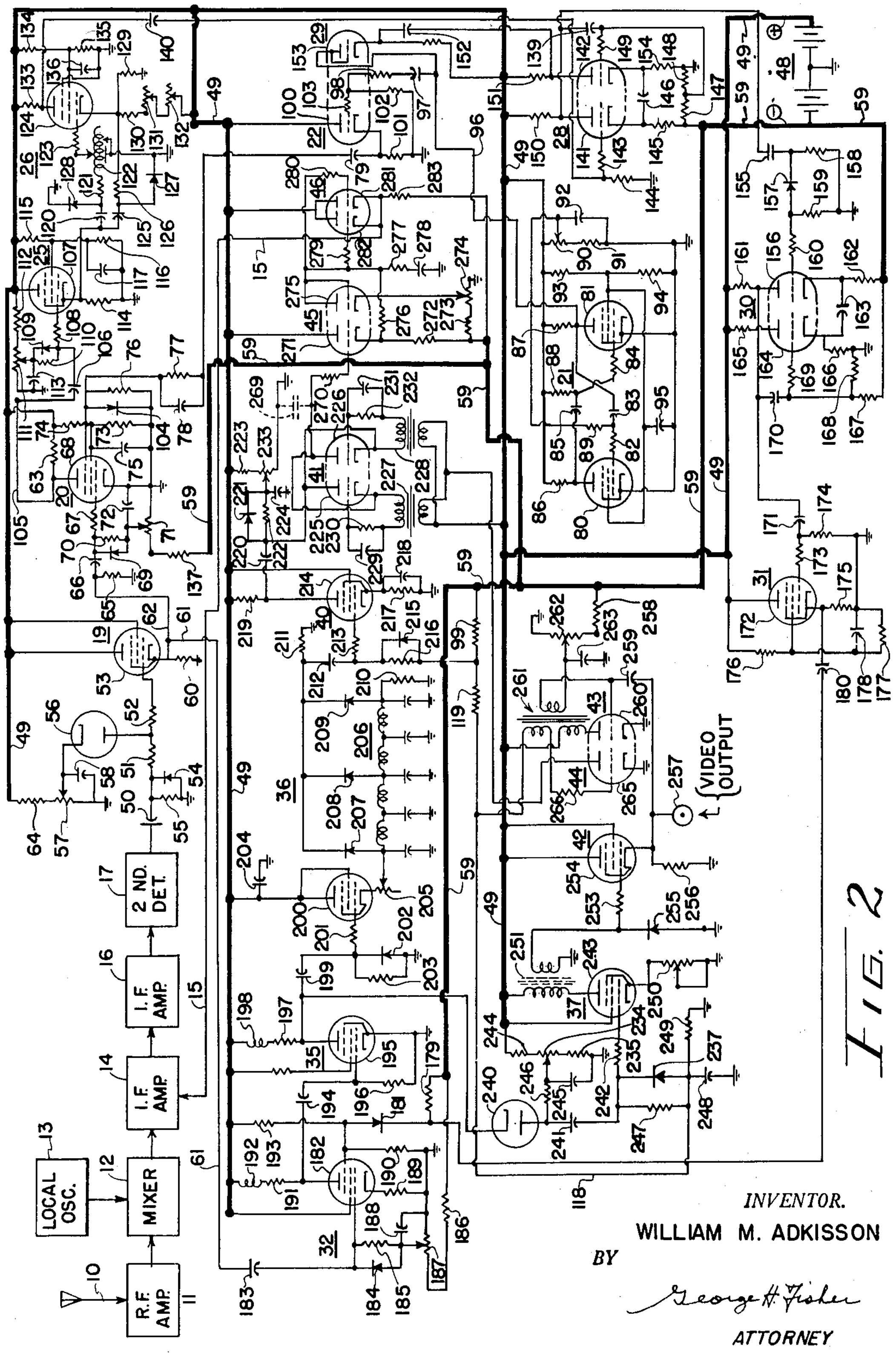

These and other objects of the present invention will be understood upon considering the following specification and the appended drawings of which:

Figure 1 shows the present invention in block diagram form with functional connections interconnecting the various elements of the receiver, decoder circuits, gating circuits, and gain control circuits; and Figure 2 shows schematically the major components considered in the present invention showing only the high frequency portion of the apparatus in block diagram form in the manner in which it appears in Figure 1.

In the art of radio communication, techniques have been developed using pulses of radio energy to convey intelligence in accordance with the displacement in time of individual pulses from normal positions in a cyclically recurring train of such pulses. Communication by this technique has been found to be severely affected by "noise" pulses of radio energy which occur at random intervals but may nonetheless actuate the communication apparatus, thus giving false signals. The seriousness of the problem increases as the range of the equipment is extended to where the signal pulses approach the normal noise level.

One method of increasing the dependability of such communication systems is to use, not a single transmitted pulse, but a group of several such pulses. If these pulses are transmitted at arbitrarily selected intervals, and if a receiver is arranged to respond only when a pulse group of the required number of pulses having the required spacing is received, a false signal from the receiver can occur only when random noise pulses happen to occur at the selected instants. The present invention relates to an improved receiver adapted for pulse communication using the above described triple pulse coding technique to maintain intelligibility for the particular case when the third pulse also conveys the intelligence being communicated.

Referring to Figure 1, there appears a terminal near the bottom of the figure which is to supply intelligence pulses in accordance with the intelligence pulses impressed on a radio frequency carrier by a distant transmitter not shown. The modulation takes the form of a train of pulse groups recurring at a selected repetition frequency, each group consisting of two spaced coding pulses followed by an intelligence pulse. Reference numeral 10 represents the antenna input for a high frequency receiver which includes a radio frequency amplifier stage or stages 11 tuned to the frequency of the transmitter. The output of the amplifier 11 is fed into a mixer stage 12 wherein the incoming radio frequency signal is mixed with the output of a local oscillator 13 the frequency of which is maintained greater than that to which the receiver is tuned by a fixed amount. The resultant intermediate frequency signal is fed through a first intermediate frequency amplifier section 14 which has an automatic gain control conductor 15 connected thereto. This particular section may comprise several individual amplifying stages. The output of the section 14 is fed into a further intermediate frequency amplifier section 16, and the latter in turn has its output applied to a second detector 17. The second detector functions in a normal manner to remove the intermediate frequency carrier signal component: its output reproduces the original pulse train modulated onto the transmitter carrier. The apparatus thus far described may be of any conventional well-known type used in the receiving and amplification of high frequency carrier signals which are modulated by pulses of relatively short duration.

In one particular embodiment of the present invention the transmitted signal group, and hence the output of the second detector stage 17, comprises two coding pulses spaced a predetermined time interval, four microseconds apart followed by an intelligence pulse which is in turn spaced from the second coding pulse by a different predetermined time interval, six microseconds, substantially as shown in the inset 18. The light vertical lines in the inset 18 and also in the other insets shown in Figure 1, are for the purpose of illustrating the time relation between the pulses shown in the different insets. The output of the second detector 17 is fed into a cathode follower 19. The output of the cathode follower 19 is a train of pulse group similar to that shown in the inset 18, recurring at the predetermined repetition frequency, and is connected to a first, normally inoperative gated amplifier 20. The gated amplifier 20 also has a further input signal which originates from an asynchronous multivibrator 21 whose free-running frequency is slightly less than the pulse repetition frequency of the coded groups being received by the receiver and appearing on the output of the cathode follower 19. The output of the asynchronous multivibrator 21 feeds through a cathode follower 22 to the gated amplifier 20. The pulse from the asynchronous multivibrator 21 is in the form of a square wave pulse substantially as shown in inset 23. The length of the multivibrator pulse exceeds that of the portion of the received pulse group including the two coding pulses, and it normally ends after the second coding pulse but before the intelligence pulse.

When the pulse from the asynchronous multivibrator circuit 21 occurs at the same time as the coding pulses from the cathode follower 19, the first gated amplifier operates, supplying an output signal of the form shown in the inset 24; the coding pulses are transmitted with negative polarity but the intelligence pulse is cut off. The coding pulses are then fed through a limiter section 25 to a decoder section 26.

The output of the decoder section 26 is a single pulse which is negative and which is shown in the inset 27. This negative pulse from the decoder 26 is fed to a delay multivibrator 28. This delay multivibrator has a first output which is fed through a diode isolating stage 29 to the asynchronous multivibrator 21 and acts to synchronize the multivibrator with the pulses which are being received on the antenna 10. In other words, the asynchronous multivibrator 21 is effectively locked to the incoming pulse repetition frequency when the decoder 26 has an output indicating that the asynchronous multivibrator output pulse has occurred at the same time as the received pulse group from the receiver cathode follower output 19.

The delay multivibrator 28 also has a second output which is fed to a gate generator multivibrator 30. This gate generator multivibrator supplies an output pulse or gating signal which is timed to occur during the same time interval as the intelligence pulse which follows the two coding pulses of the incoming received pulse group. The output from the gate multivibrator is fed through a cathode follower stage 31 to a second normally inoperative gated amplifier stage 32. The inputs to this latter gated amplifier stage are the signal pulse group from the cathode follower 19, supplied through a conductor 61 as shown in the inset 33, and the gating pulse from the cathode follower 31, as shown in the inset 34. When these inputs coincide, the second gated amplifier 32 operates, supplying a single negative pulse synchronized with the intelligence pulse that follows the two coding pulses. This intelligence pulse is fed through the video amplifier 35 to a pulse stetching stage 36 as well as to a limiter and differentiator stage 37.

The pulse stretcher circuit is arranged to increase the time length of the intelligence pulse as can be seen by comparing the intelligence pulse shown in inset 38 to the stretched pulse shown in inset 39. Actually, the time length of the stretched pulse as compared to the intelligence pulse may be longer but it is shown in this manner for simplicity. The stretched pulse is fed through a switch driver stage 40 to a bi-directional switch stage 41.

The bi-directional switch, as will be explained in detail below, is arranged to establish an output potential which is directly proportional to the magnitude of the signal applied to the pulse stretching stage 36.

Inasmuch as the stretched pulse which is applied to the bi-directional switch stage 41 has had its leading edge modified by circuit constants, it is desirable to check the amplitude of the stretched pulse at a central portion thereof. A sampling pulse for checking the amplitude of the stretched wave applied to the bi-directional switch is derived by taking the output of the limiter differentiator stage 37 and applying the same through a cathode follower 42 to a blocking oscillator 43. The blocking oscillator is so arranged that the overshoot pulse following the initial operation of the oscillator is amplified by an amplifier 44 and is applied to the bi-directional switch to render the switch operative only during the central portion of the stretched wave which is applied to the bi-directional switch from the switch driver stage 40.

As mentioned previously, the output of the bi-directional switch is a potential directly proportional to the magnitude of the pulse applied to the pulse stretching stage 36 which is developed across the interelectrode capacity at the output of bi-directional switch stage 41 and which is represented in the drawings as condenser 269. This potential is utilized to control the conduction of a cathode follower filter stage 45, which in turn controls the output potential on a further cathode follower stage 46. The output of this latter cathode follower stage is fed by means of conductor 15 back to the intermediate frequency amplifier stages 14 so as to control the gain thereof in accordance with the magnitude of the signals which are applied to the pulse stretching circuit 36.

Referring now to Figure 2, it will be noted that the receiver under consideration is shown in block diagram form from the radio frequency amplifier section 11 through the second detector 17. The design of such a receiver is dependent upon the particular frequency range in which the apparatus is arranged to operate. Power is supplied to the receiver by a power supply 48 having a positive supply bus 49 and a negative supply bus 59.

The output from the second detector 17 passes through a coupling condenser 50 and a pair of resistors 51 and 52 to the input of a pentode 53. On the input of the pentode 53 cooperating with the condenser 50 is a clamping circuit including an asymetrically conducting device 54 which may be in the form of a crystal rectifier, and a resistor 55. Connected between the resistor 51 and 52 is a diode limiter 56, which serves to limit the positive peaks of the signals received from the second detector 17. This diode 56 has its cathode connected to the positive supply bus 49 through a potentiometer 57 and a resistor 64 to establish the clipping level or limiting level of operation of the diode. A condenser 58 functions in the normal manner as a by-pass condenser. As will be discussed in detail below, the functioning of the crystal rectifier 54, the resistor 55, and the coupling condenser 50 is to establish a base line for the incoming pulses which is independent of any noise that is present ,the incoming pulse as well as the noise all appearing upon a fixed base line.

The output of the pentode 53 is taken across a cathode resistor 60. One of the outputs passes through a conductor 61 to a gated amplifier stage 32, while the conductor 62 connects output resistor 60 to the gated amplifier stage 20.

Stage 20 comprises an input resistor 65 having one end thereof connected to a coupling condenser 66. The coupling condenser is connected by means of a resistor 67 to the input control electrode of a pentode 68. A clamping circuit including a crystal rectifier 69 and resistor 70 cooperate with the condenser 66 to establish a predetermined base line for the incoming pulses received from the cathode follower stage 19. The biasing level for this clamping action is determined by the position of the slider on a potentiometer 71, which is part of a voltage divider consisting of potentiometer 71 and resistor 137 connected between the negative supply bus 59 and ground. A by-pass condenser 72 is connected between the slider of the voltage divider 71 and ground. The screen electrode of the pentode 68 has its potential established by a voltage divider consisting of a pair of resistors 73 and 74, connected between the positive supply bus 49 and ground. A by-pass condenser 75 is connected in parallel with the resistor 73 and functions in the normal manner. The anode of the pentode 68 is connected to the positive supply bus 49, through an anode load resistor 63, while the cathode of pentode 68 is grounded. The suppressor electrode of the pentode 68 also has a clamping circuit at its input, consisting of a resistor 76 and a rectifier 104, and is arranged to receive a gating pulse through a coupling network which includes a resistor 77 connected in parallel with a condenser 78 and a coupling condenser 79.

The gating pulse for the suppressor grid of the pentode 68 is derived from the asynchronous or free-running multi-vibrator 21. This multi-vibrator comprises a pair of pentodes 80 and 81. Coupled between the control electrode of the pentode 80 and the anode of the pentode 81, are a series connected resistor 82 and condenser 83. Connected between the control electrode of the pentode 81 and the anode of the pentode 80 are a series connected resistor 84 and a condenser 85. The pentode 80 has a plate load resistor 86 while the pentode 81 has a plate load resistor 87, both connected to the positive supply bus 49. A resistor 88 couples the control electrode of the pentode 81 to the positive supply bus 49 while the control electrode of the pentode 80 is connected through a resistor 89 to an adjustable biasing source which includes a potentiometer 90, a resistor 91, and a by-pass condenser 92 connected between the slider of potentiometer 90 and ground. The screen electrode potential for both of the pentodes 80 and 81 is established by a voltage divider including a resistor 93 and a resistor 94 connected between the positive supply bus 49 and ground. A condenser 95 functions in the normal manner as a by-pass condenser across the resistor 94.

The output of the multi-vibrator section 21 is coupled through a conductor 96 and a coupling condenser 97 to a voltage divider consisting of resistors 98 and 102, and through grid resistor 103 to the input of cathode follower section 22 which includes a triode 100. The output of the cathode follower section 22 is taken across a cathode resistor 101 and is fed into the suppressor electrode circuit of the gated amplifier 20 through coupling condenser 79 and the resistor-condenser assembly consisting of resistor 77 and condenser 78.

When there is an output from the gated amplifier 20, it passes through a conductor 105 and a coupling condenser 106 to the input of limiter stage 25, which includes a pentode 107, by way of a resistor 108. On the input of the pentode 107 is a clamping circuit including a rectifier 109 which is connecetd in parallel with a resistor 110. One end of the rectifier 109 is connected to the grid resistor 108 while the other end is connected to a voltage divider including a potentiometer 111 and a resistor 112 connected between ground and the positive supply bus 49. A by-pass condenser 113 functions in the normal manner across a portion of potentiometer 111. The output of the pentode 107 appears across a cathode resistor 114. The screen grid potential of the pentode 107 is established by a voltage divider which includes resistors 115 and 116, the latter of which is by-passed by condenser 117, connected between the positive supply bus 49 and ground, and the anode of pentode 107, is connected directly to the positive supply bus 49.

The output of the limiter stage 25 is fed to the input of the decoder 26. The input of this decoder includes a coupling condenser 120 which feeds the incoming pulse from the limiter through a resistor 121 to an open-ended delay line 122. A grid resistor 123 is coupled between the delay line 122 and the input control electrode of a pentode 124.

The output of the limiter 25 is also fed to the cathode of the pentode 124 through a coupling condenser 125 and a resistor 126. A rectifier 127 is connected between the output side of coupling condenser 125 and ground while a rectifier 128 is coupled between the output side of coupling condenser 120 and ground. These two rectifiers function to maintain a fixed base line for the pulses which are passed through the coupling condensers 120 and 125.

The biasing potential to the pentode 124 is established by a voltage divider network in the cathode circuit of the pentode 124. This voltage divider circuit includes a resistor 129 which connects the cathode to ground and a resistor 130 in series with a pair of rheostats 131 and 132 connects the cathode to the positive supply bus 49.

A resistor 133 is connected as a conventional anode load resistor, while a voltage divider including resistors 134 and 135, connected between the positive supply bus 49 and ground, functions to establish the potential for the screen electrode of the pentode 124. A condenser 136 functions in a normal manner to by-pass the screen electrode signals to ground. The suppressor electrode of the pentode 124 is connected directly to ground.

The output from the decoder section 26 is fed to the control electrode of a normally conducting triode 141 included in the delay multi-vibrator 28 through a coupling condenser 140 and a resistor 143. The delay multi-vibrator also includes a normally cut off triode 142. The control electrode of the triode 141 is connected to ground through resistors 143 and 144. The cathode of the triode 141 is connected to the cathode of triode 142 through a condenser 146, and also resistors 145, 147, 148, and 154 in parallel with the condenser 146. The junction of resistors 145 and 147 is connecetd to the negative supply bus 59, and the junction of resistors 148 and 154 is connected to ground to establish the biasing potentials of the cathodes of triodes 141 and 142 and the control electrode of the triode 142 which is connecetd to the junction of resistors 147 and 148 through a resistor 149. A resistor 150 acts as the anode load resistor for the triode 141 while the resistor 151 acts as the anode load resistor for the triode 142. The anode of triode 141 is connected to the control electrode of triode 142 through coupling capacitor 139 and resistor 149.

One output from the delay multi-vibrator 28 is taken from the anode of the triode 142 and is passed through a coupling condenser 152 to the cathode of a diode connected triode 153, which comprises the diode isolating stage 29. The anode of the triode 153 is connected to the asynchronous multi-vibrator 21 through conductor 96, coupling condenser 83, and resistor 82 to the control electrode of the pentode 80.

The other output of the delay multi-vibrator 28 is taken from the anode of triode 141 and fed through a coupling condenser 155 to the input circuit of a normally conducting triode 156 of the gate generating multi-vibrator 30 including a further, normally non-conducting triode 164. The input circuit of the triode 156 includes a rectifier 157, a resistor 158 which cooperates with the condenser 155 to form a differentiating network for the pulse received through the condenser 155, a grid grounding resistor 159, and a further grid resistor 160. The triode 156 has an anode load resistor 161 and a cathode resistor 162 connected to the negative supply bus 59. The cathode of the triode 156 is connected by means of a condenser 163 to the cathode of a further triode 164. Triode 164 has an anode load resistor 165 and a cathode resistor 166 connected to ground. A biasing potential for the control electrode of triode 164 is established by a voltage divider network including resistors 167 and 168 connected between the negative supply bus 59 and ground. A grid resistor 169 couples the control electrode of triode 164 to the junction of voltage divider resistors 167 and 168. A coupling condenser 170 couples the anode of the triode 156 to the control electrode of the triode 164.

The output from the gate generating multi-vibrator 30 is taken from the anode of triode 156 and is fed through a coupling condenser 171 to the input circuit of the cathode follower stage 31, which includes a pentode 172. The pentode 172 has an input circuit including grid resistors 173 and 174 and a cathode output resistor 175. The screen electrode potential is established by a pair of series connected resistors 176 and 177, the latter of which is by-passed by a condenser 178, connected between the positive supply bus 49 and ground.

The output of the cathode follower 31 is fed through a coupling condenser 180 to the gated amplifier stage 32. This coupling circuit also includes a rectifier 181 which is connected to the suppressor electrode of a pentode 182 in the gated amplifier 32. The operating level of the rectifier 181 is established by connecting the rectifier to the negative supply bus 59 through a resistor 179 and by the voltage divider between positive supply bus 49 and ground consisting of resistors 190 and 193. The input to the pentode 182 additionally includes a coupling condenser 183 which couples the output of the cathode follower stage 19 to the input control electrode of the pentode 182. The input of the pentode 182 additionally includes a clamping circuit consisting of a rectifier 184 and a resistor 185 which cooperate with the coupling condenser 183 to establish a predetermined base line for the incoming pulses from the cathode follower stage 19. The potential of the base line is established by a voltage divider consisting of a resistor 186 and a potentiometer 187, the latter of which has the tapped portion thereof bypassed by condenser 188, connected between the negative supply bus 59 and ground.

The cathode of the pentode 182 is connected to ground through cathode resistor 189. The suppressor electrode is biased negatively by means of a voltage divider consisting of resistor 193 rectifier 181 and resistor 179 connected between the positive supply bus 49 and the negative supply bus 59. The anode of the pentode 182 is connected through a resistor 191 and an inductance element 192 to the positive supply bus 49. The screen grid of the pentode 182 is connected directly to a positive power supply bus.

The output of the pentode 182 or the gated amplifier stage 32 is passed through a coupling condenser 194 to the control electrode of a pentode 195 in the video amplifier section 35. A control electrode is grounded by a resistor 196, while the anode is connected by a resistor 197 and an inductance 198 to the positive supply bus 49, and the screen electrode is connected to the positive power supply bus 49 through a screen load resistor.

The output of the video amplifier 35 is passed through a coupling condenser 199 to the input of a pentode 200. This latter connection includes a grid resistor 201. For establishing a predetermined base line for the pulse originating in the amplifier 35, there is provided a clamping circuit cooperating with coupling condenser 199. The clamping circuit consists of a rectifier 202 which has connected in parallel therewith a resistor 203, both of which are grounded at their lower terminals.

The pentode 200 is a part of the pulse stretching circuit 36 and has its anode and screen electrode connected together and to the positive supply bus 49. The signals appearing in the plate and screen circuits are by-passed to ground by a condenser 204. The cathode of pentode 200 has a potentiometer 205 connected thereto, the slider of which is connected to an artificial transmission line 206, which has a plurality of rectifiers 207, 208, and 209 connected to junctions of the transmission line along the length thereof and a terminating impedance 210 which is preferably the characteristic impedance of the artificial transmission line. Full details of this pulse stretching circuit 36 are shown and claimed in a co-pending application of Merle R. Ludwig, Serial No. 309,029, which is entitled "Electrical Pulse Stretching Apparatus" filed of even date herewith. The desired output from the transmission line is developed across a resistor 211, and the pulse appearing thereon is passed through a coupling condenser 212 into the input of the switch driver 40 by way of a grid resistor 213. The grid resistor 213 is connected to the control electrode of a pentode 214. The incoming signal applied to the pentode 214 through the coupling condenser 212 is clamped to a predetermined base line through the action of a clamping circuit consisting of a rectifier 215 and a resistor 216 connected in parallel. The value to which the base line of the incoming signal is clamped is determined by connecting the lower junction of rectifier 215 and resistor 216 to a voltage divider consisting of resistors 99, 119, and 249 connected between negative supply bus 59 and ground. The cathode of the pentode 214 is connected to ground by means of resistor 217 which is by-passed by condenser 218. A resistor 219 forms an anode load resistor for the pentode 214 and the screen electrode is connected directly to the positive supply bus 49. The output of the pentode 214 is coupled by means of a coupling condenser 220 to the bi-directional switch stage 41. The input base line for the bi-directional switch section is established by means of a clamping circuit consisting of a rectifier 221 having a resistor 222 connected in parallel therewith, with the resultant parallel configuration connected between the input circuit of the bi-directional switch and a voltage divider network. The voltage divider consists of a resistor 223 and a potentiometer 233 connected between the positive supply bus 49 and ground. The bi-directional switch stage additionally includes a pair of triodes 225 and 226, said triodes being arranged so that the anode of one is connected to the cathode of the other, the anode of the triode 225 being connected to the cathode of the triode 226 to form the input section to the switch stage, while the anode to the triode 226 is connected to the cathode of the triode 225 to form the output connection of the switch stage including the stray inter-electrode capacitance load represented by dotted condenser 269. Connected between the control electrodes and cathodes of each of the triodes 225 and 226 are the secondary windings of input transformers 227 and 228 respectively. Also included in the control electrode to cathode connection of triode 225 in series with the secondary winding of transformer 227 are parallel connected condenser 229 and resistor 230. Included in the control electrode to cathode connection of triode 226 in series with the secondary winding of transformer 228 are parallel connected condenser 231 and resistor 232.

The output of the video amplifier 35, which drives the pulse stretching stage 36, is also connected to a limiter and differentiator stage 37. This connection includes a diode 240 which has its cathode connected to the anode of the pentode 195 of video amplifier 35 and its anode connected through a coupling condenser 241 and a resistor 242 to the control electrode of a pentode 243. The level of operation of the diode 240 is determined by a voltage divider network, which has a portion thereof by-passed by condenser 245, consisting of resistor 244, potentiometer 234, and resistor 235 connected between the positive supply bus 49 and ground. A resistor 246 connects the anode of the diode 240 to the slider of a potentiometer, which is a portion of the voltage divider network just identified. The output pulse from video amplifier 35 passing through the coupling condenser 241 has its base line established by a clamping circuit including a rectifier 237 and a resistor 247 connected in parallel. The lower end of the clamping circuit is connected to the negative supply bus 59 through conductor 118 and resistors 119 and 99, and also connected to ground through a resistor 249, which is connected in parallel with a condenser 248. The pentode 243 has an adjustable cathode resistor 250 and has the primary winding of a differentiating type transformer 251 connected between its anode and the positive supply bus 49. The output of the transformer 251 is coupled through resistor 253 to the input control electrode of a pentode 254 in the cathode follower stage 42. A rectifier 255 is connected between the left junction of the resistor 253 and ground. This rectifier functions in the usual manner to establish a predetermined base line for the pulses applied to the input of the pentode 254. The anode and the screen electrode of pentode 254 are both connected directly to the positive supply bus 49. An output resistor 256 is connected between the cathode of the pentode 254 and ground. Connected to this cathode resistor is the video output terminal 257, upon which appears only the intelligence pulse of the pulse group appearing at the output of second detector stage 17, which may be utilized in any desired circuit. The output of the resistor 256 is also fed through a coupling condenser 259 to the input control electrode of a triode 260 of blocking oscillator 43. Blocking oscillator 43 also includes output transformer 261 which regeneratively couples the output of triode 260 to the input of triode 260 to provide for oscillation of the circuit upon an occurrence of an input pulse to the control electrode of the triode 260. The primary winding of the transformer 261 is connected between the anode of triode 260 and the positive supply bus 49, and a first secondary winding of the transformer is connected to the control electrode of the triode 260 and is also connected to the negative supply bus 59 by way of a voltage divider network a portion of which is by-passed by a condenser 263. The voltage divider consists of a potentiometer 262 and a resistor 258.

A further secondary winding of the transformer 261 is connected to the negative supply bus 59 through resistors 119 and 99 and is also connected to the control electrode of triode 265 of amplifier 44 through a resistor 266. The output of the triode 265 is developed across the primary windings of the transformers 227 and 228 of the bi-directional switch 41 which are connected in parallel and act as the anode load for triode 265. A detailed description of the bi-directional switch 41, blocking oscillator 43, and amplifier 44 will be found in a copending application of Jack R. Walter, entitled "Automatic Gain Control Circuits for Pulse Type Receivers," filed of even date herewith.

The output of the bi-directional switch 41 is fed through a resistor 270 to the control electrode of a triode 271 of the cathode follower section 45. This cathode follower section has its cathode connected to ground through resistors 272 and 273 and potentiometer 274, and the junction of resistors 273 and 272 is connected to the negative supply bus 59.

The slider of potentiometer 274 is connected to a diode 275 to establish the operating potential for that diode, which acts as a limiter on the input of cathode follower stage 46. The output of the cathode follower section 45 is fed through a filter network which consists of the resistors 276 and 277 and a condenser 278 respectively connected in series between the cathode of triode 271 and ground. The output of the filter is taken at the junction of resistors 276 and 277 and is fed through a pair of resistors 279 and 280 to the control electrodes of a pair of parallel connected triodes 281 and 282 of the cathode follower stage 46. The output of the triodes 281 and 282 is developed across the common cathode resistor 283 and by way of conductor 15 is fed back to the intermediate frequency amplifier section 14. The lower end of common cathode resistor 283 is connected to the negative supply bus 59.

The following table gives values of the various resistances and condensers which were used in one embodiment of the invention:

| Reference Character | Value |
|---|---|
| 82, 84, 103, 108, 123, 143, 149, 160, 169, 173 | 10 ohms. |
| 52, 201, 213, 242, 253, 270, 279, 280 | 100 ohms. |
| 217 | 180 ohms. |
| 189 | 300 ohms. |
| 210 | 360 ohms. |
| 121, 126 | 470 ohms. |
| 129, 250 | 500 ohms. |
| 256 | 560 ohms. |
| 65, 175, 205, 274, 277 | 1,000 ohms. |
| 119, 191, 249 | 1,500 ohms. |
| 51, 60, 93, 114 | 2,200 ohms. |
| 246 | 2,700 ohms. |
| 219 | 3,000 ohms. |
| 190 | 3,300 ohms. |
| 63, 67, 133, 151, 165, 197, 266 | 4,700 ohms. |
| 86, 87, 187, 234, 262 | 5,000 ohms. |
| 115 | 6,800 ohms. |
| 244 | 7,500 ohms. |
| 57, 73, 101, 111, 130, 131, 132, 154, 166, 176, 179, 196, 211, 235, 258, 273. | 10,000 ohms. |
| 71, 150, 161, 283 | 15,000 ohms. |
| 74 | 18,000 ohms. |
| 77, 94 | 22,000 ohms. |
| 90 | 25,000 ohms. |
| 99, 145, 162 | 27,000 ohms. |
| 193 | 33,000 ohms. |
| 116 | 36,000 ohms. |
| 144, 148, 158, 159, 168, 174, 177, 186 | 47,000 ohms. |
| 233 | 50,000 ohms. |
| 55, 64, 185, 203, 216, 222, 223, 247 | 51,000 ohms. |
| 112, 137 | 56,000 ohms. |
| 134 | 68,000 ohms. |
| 76, 91 | 75,000 ohms. |
| 98, 272 | 100,000 ohms. |
| 70, 102, 110, 135 | 220,000 ohms. |
| 276 | 431,000 ohms. |
| 147, 167 | 470,000 ohms. |
| 230, 232 | 680,000 ohms. |
| 88 | 750,000 ohms. |
| 89 | 1.78 megohms. |
| 155 | 10 micro-microfarads. |
| 78, 269 | 50 micro-microfarads. |
| 259 | 62 micro-microfarads. |
| 85 | .0001 microfarad. |
| 83 | .00015 microfarad. |
| 263 | .0002 microfarad. |
| 50 | .0005 microfarad. |
| 146 | .0006 microfarad. |
| 183, 194, 199, 218, 241 | .001 microfarad. |
| 229, 231 | .0015 microfarad. |
| 66, 106, 163 | .002 microfarad. |
| 95 | .0047 microfarad. |
| 72, 75, 79, 92, 97, 113, 117, 136, 140, 152, 171, 178, 212 | .01 microfarad. |
| 58, 170, 180, 183, 220, 248, 278 | .1 microfarad. |
| 120, 125 | .47 microfarad. |
| 139, 204, 224, 245 | 1 microfarad. |

The following table gives the types of rectifiers and vacuum tubes used in the embodiment of the invention utilizing the resistances and condensers tabulated above:

| Reference Character | Value |
|---|---|
| 54, 69, 104, 109, 127, 128, 157, 181, 184, 202, 207, 208, 209, 215, 221, 237, 255 | CK707. |
| 56, 240 | CK5704. |
| 124 | 6AH6. |
| 53, 80, 81, 107, 172, 195, 200, 214, 243, 254 | 6AN5. |
| 68, 182 | 6AS6. |
| (281, 282) | 6U6. |
| (271, 275) | 12AT7. |
| (141, 142); (156, 164); (225, 226); (260, 265) | 12BH7. |
| (100, 153) | 5814. |

In the preferred embodiment using the components tabulated above, inductances 192 and 198 both had the value of 100 microhenries; transformers 227 and 228 were both "Utah" transformers type 9280; transformer 251 was a differential transformer; and transformer 261 was a blocking oscillator transformer. Also, artificial transmission line 206 consisted of 18 sections, instead of 4 sections as shown for simplicity in Figure 2, with sampling occurring at every other section as shown in Figure 2. The inductances used in artificial transmission line 206 each had the value of 10 microhenries. The input and output condensers of artificial transmission line 206 had the value of 50 micro-microfarads and all other capacitors had the value of 100 micro-microfarads. All the rectifiers used in artificial transmission line 206 were of the CK707 type. The voltage supplied by supply bus 49 was 130 volts positive, and the voltage supplied by supply bus 59 was 130 volts negative.

*Operation*

Concerning the operation of the present apparatus, first assume that the antenna 10 receives a modulated carrier frequency signal, which is amplified by the radio frequency amplifier 11, converted into an intermediate frequency through the interaction of the mixer 12 and the local oscillator 13, and is in turn amplified by the intermediate frequency amplifier sections 14 and 16. The output from the intermediate frequency amplifier section 16 is then fed through the second detector 17, where a demodulated signal will appear, for example, in the form shown on the inset 18 in Figure 1. For purposes of the present explanation, let it be assumed that there are two code pulses followed by an intelligence pulse. These coding pulses and the intelligence pulse form a pulse group which will be fed through the coupling condenser 50 to the input control electrode of the pentode 53.

Rectifier 54 cooperates with condenser 50 and resistor 55 to comprise a clamper or "D. C. restorer." A number of similar clampers are used throughout the apparatus, and the function of such clampers in the system as about to be described is understood to apply to all of them.

The output of detector 17 is a pulsating unidirectional voltage comprising a group of positive pulses followed by a relatively long interval of no signal. The average value of the detector output, in the absence of noise pulses, has a value determined solely by the amplitude of the signal pulses. Since automatic gain control is provided through conductor 15 and amplifier 14, the pulse amplitude can be determined at will, within the useful range of the apparatus. Moreover it is at once apparent that the average value is only very slightly more positive than zero, and that it remains constant. Under these conditions a tube to which the signal is coupled may be given a fixed bias such that pulses of the amplitude maintained by the automatic gain control encompass the full linear input range of the tube, giving most efficient operation of this portion of the system.

When there is noise in addition to the signal pulse, as is always the case, the situation is somewhat different. Not only is the average value of the detector output different from that with no noise, which could be compensated for by selecting a different bias for the following tube, but it is not constant, varying rather widely from instant to instant in a random and hence unpredictable fashion. For any fixed bias voltage this means that varying signal bias is added erratically which results in some pulses going beyond the linear portion of the tube characteristic, while others do not use the linear portion fully.

The effect of the clamping diode to establish a base line at which all pulses, both signal and noise, are initiated as far as the following stage is concerned. The bias of the following stage can now be determined with respect to this level at one extreme of the linear portion of the tube curve, and the maximum value of the pulses may be set by means about to be described to fall at the other extreme of the linear portion of the tube curve.

In the event that the magnitude of the received pulses or of the noise is greater than a predetermined amount, it is desired that the amplitude be clipped or limited. This is accomplished by the diode 56 which is rendered conductive if a positive potential is applied to the anode which is greater in magnitude than the positive potential which is on the cathode thereof, the latter being determined by the setting of the potentiometer 57 which has one end thereof connected to the positive supply bus 49 through resistor 64.

The signal applied to the pentode 53 is reproduced across the cathode resistor 60, and likewise across the resistor 65, from which the signal is applied through the coupling condenser 66 to the input of the gated amplifier stage 20 comprising pentode 68. The pulse group, which passes through the coupling condenser 66 and is applied to the control electrode of the pentode 68 through resistor 67, has its base line established by the rectifier 69 in the same manner as the base line was established in the preceding stage through the action of rectifier 54. In the present circuit, the base line is determined by the setting of the slider of potentiometer 71, and this is at a predetermined negative potential because of the connection of the potentiometer 71 between ground and the negative supply bus 59 through resistor 137. As before, the base line is not affected by incoming noise or by the presence of the pulse group, and the pulse group and noise all appear on top of the base line. There is no danger of saturating pentode 68 and the following stages since the signal has already been limited in the previous stage by diode 56.

The pentode 68 is biased to cut-off by the negative voltage applied to the control electrode from voltage divider 71. A further negative voltage is applied to the suppressor electrode of pentode 68 due to the positive clamping of the square wave gating pulse from the asynchronous multivibrator 21 by rectifier 104, and due to this negative biasing of the suppressor electrode, pentode 68 will remain nonconductive even when a pulse group is applied to the input control electrode. However, when a gating pulse from the asynchronous multi-vibrator 21, as shown in inset 23 on Figure 1, is applied to the suppressor electrode of pentode 68 at the same time that a pulse group is applied to the control electrode of the pentode 68, an output signal appears upon the anode of the pentode 68, and this output signal is substantially as shown in the inset 24 on Figure 1. The output pulse from the asynchronous multi-vibrator 21 is taken across the anode resistor 87 of pentode 81 and is fed through conductor 96, coupling condenser 97, and resistor 98 to the input of the cathode follower 22, where the pulse appears with the same sense upon the cathode resistor 101. The pulse is then applied through the coupling condenser 79 and through the parallel circuit including resistor 77 and condenser 78 to the suppressor electrode of the pentode 68. The resistance-capacitance divider circuit functions to maintain the substantially square wave gating pulse from the asynchronous multi-vibrator by matching the capacitive reactance due to the inter-electrode capacitance at the suppressor electrode of pentode 68. The rectifier 104 establishes the peak line for the gating pulse at zero or ground potential, in the manner described above for previous clamping circuits. Therefore, the base line for the gating pulse falls at some negative value, biasing the suppressor electrode negatively, as mentioned above, between pulses.

The asynchronous multi-vibrator 21 is a conventional free-running multi-vibrator which produces across the anode resistor 87 of pentode 81 a substantially square wave gating pulse which is of relatively short duration compared to the full period of the multi-vibrator, but which is of a relatively long duration as compared to the length of the signal pulse group. This square wave gating pulse occurs at a predetermined frequency, which is selected to be slightly less than the frequency or repetition rate of the received pulse group. In one practical embodiment of the invention the signal pulse repetition rate was 4,650 per second, and a gating pulse repetition rate of 4,450 per second was chosen to give 200 coincidences per second in the absence of synchronization. When the pulse group and the gating pulse occur at the same time so that an output signal appears at the anode of pentode 68 as shown in inset 24 on Figure 1, the gating pulse from multi-vibrator 21 is synchronized to the signal pulse group through the action of decoder stage 26, delay multi-vibrator stage 28, and diode stage 29. The operation of these stages will be explained below. If for some reason a signal pulse group is not received when the next gating pulse is applied to the pentode 68, after a first gating pulse is synchronized by a received signal pulse, the pentode 80 of the multi-vibrator 21 continues to conduct for its normal period instead of being cut off, as will be explained below. The pentode 81 of multi-vibrator 21 conducts for its normal period, and then the pentode 80 conducts again, later than it would have if a signal pulse group had been received during its previous conduction period. If no signal is received for three successive conduction periods of pentode 80, each of which is delayed more than the one before, the multi-vibrator 21 is so far out of step with the received pulse group that pentode 68 does not conduct, and this condition continues for about one two-hundredth of a second until new synchronization takes place, but if only one pulse group out of three successive pulse groups is received, the multi-vibrator 21 becomes synchronized and allows for three further misses before becoming unsynchronized.

The output from the anode of the pentode 68 is fed through conductor 105, coupling condenser 106, and resistor 108 to the control electrode of the pentode 107 in the limiter stage 25. The base line of the pulses passing through the coupling condenser 106 is clamped to a fixed base line by the action of the clamping rectifier 109 which functions in the same manner as the clamping circuits previously described. The base line is determined by the adjustment of the slider of potentiometer 111.

The output of the limiter stage 25 is taken across the cathode resistor 114, and is fed to the decoder section 26.

In considering the operation of the decoder section 26, let it first be assumed that the pulse group received is as set forth above and comprises two coding pulses followed by an intelligence pulse. The two coding pulses are separated by a predetermined time interval, as is the intelligence pulse from the second of the coding pulses although the latter time separation is not important insofar as the decoder is concerned. The pulses at this point are negative, and pass through the coupling condenser 120 and resistor 121 to the transmission delay line 122. Pentode 124 is biased to cut off and in passing down the transmission line the first pulse, being negative, produces no change in the condition of the tube. However, since the line is open-circuited, the pulse is reflected with opposite polarity and appears as a positive pulse upon the control electrode of the pentode 124. The delay of this transmission line is arranged so that the first reflected pulse appears upon the control electrode of the pentode 124 at substantially the same time that the second code pulse is applied to the cathode through the condenser 125 and resistor 126. The appearance of one pulse only upon either the control electrode or the cathode is insufficient to cause the pentode to conduct. However, when the pulses occur on the cathode and control electrode at the same time the pentode is able to conduct, and there appears upon the anode thereof a negative pulse. This negative pulse is shown in the inset 27 of Figure 1, after it has passed through the coupling condenser 140, and it can be seen that this pulse has the same relative time relationship as the second coding pulse of signal pulse group.

The second pulse also passes down the transmission line and is reflected as a positive pulse, but at the time it appears on the pentode control electrode there is no negative pulse on the cathode, and the pentode remains cut off.

The negative pulse from condenser 140 is applied to the input of delay multivibrator 28 cutting off triode 141 and hence causing conduction in triode 142. After a period determined by the value of capacitor 146 and resistors 145, 147, 148 and 154, triode 141 again conducts, cutting off triode 142. The anode of triode 141 is thus the source of a positive pulse of a predetermined width, which is supplied to gate generating multivibrator 30 through condenser 153, and the anode of triode 142 is the source of a negative pulse of the same width, which is supplied to diode 29 through capacitor 152. The two pulses rise at the same time as the second of the coding pulses, and the negative pulse passes through isolating diode 29 and is impressed on a stable multivibrator 21 to terminate its pulse to amplifier 20, thus synchronizing the multivibrator with the second coding pulse of the incoming signal. The width of the negative pulse from multivibrator 28 is much less than the normal off time of multivibrator 21.

The positive pulse which is produced upon the anode of the triode 141 is passed through the coupling condenser 155 to the triode 156 of the gate generator multivibrator 30. The coupling condenser 155 and the resistor 158 function together as a differentiating circuit. Due to the action of the rectifier crystal 157, only the negative spike of the differentiated wave is transmitted to the input of the triode 156. The triode 156 is normally in a conductive condition the application of a negative pulse from the differentiating circuit to the input of the triode 156 causes the tube to become nonconductive and hence causes triode 164 to become conductive. After a period determined by the values of condenser 163 and resistors 162 and 166 triode 156 again conducts, cutting off triode 164. This completes the operating cycle of the apparatus and triode 156 stays in this conductive condition until a further pulse is fed into the control electrode of the triode 156. The anode of triode 156 is thus the source of a positive square wave which is applied to the cathode follower 31. The square wave or gating pulse passes through the cathode follower section 31 to the gated amplifier section 32 where it is applied to the suppressor grid of the pentode 182 through the rectifier 181. Also applied to the input of the gated amplifier stage 32 is the output taken from the cathode resistor 60 of the cathode follower stage 19. As shown in Figure 1, this output is in the form of the two coding pulses followed by the intelligence pulse and is passed through the coupling condenser 183 to the control electrode of the pentode 182. This gating pulse is shown in the inset 34 of Figure 1, and the time relationship between the gate and the pulse group can be seen by comparing insets 33 and 34 of Figure 1.

It will be noted that the control electrode of the pentode 182 is connected to the negative supply bus 59. This negative bias is effective to maintain the operating point of the pentode 182 at cut-off. The suppressor electrode of pentode 182 is also normally biased negatively by an amount sufficient to keep the pentode 182 non-conductive in the absence of a gating signal from cathode follower 31. However, when the gating pulse is applied to the suppressor grid from the cathode follower section 31, the suppressor electrode of pentode 182 is biased positively and the pentode 182 is rendered conductive if the intelligence pulse occurs at the same time as the gating pulse. This produces an output signal on the anode of the pentode 182 in the form of a single negative pulse. It will be noted that the rectifier 184 cooperates with the resistor 185 and the condenser 183 to maintain the base line of the incoming pulses from the cathode follower section 19 at a predetermined level, the level being set by the adjustment of the potentiometer 187, which forms a voltage divider across the negative supply bus 59 and ground, along with resistor 186. The inductance 192 in the anode circuit of pentode 182 functions as a peaking coil in a manner well known in the art, and, therefore, need not be explained here.

The output from the gated amplifier 32 is fed through the coupling condenser 194 to the input of the video amplifier section 35 which includes a pentode 195. The control electrode and cathode of pentode 195 form a diode rectifier which functions with the resistor 196 and condenser 194 as a clamping circuit for the input of pentode 195. The inductance 198 in the anode circuit of pentode 195 functions as a peaking coil in the same manner as does inductance 192. The pulse is amplified and is passed to a limiter and differentiator amplifier stage 37. The input to the stage 37 includes diode 240 the anode potential of which is determined by adjustment of potentiometer 234. A positive pulse appearing on the cathode of diode 240 reduces the voltage across the diode, and if the positive pulse is of sufficient magnitude the diode is cut off. Therefore, the diode 240 limits the magnitude of the signal which is applied to the stage 37 to a predetermined value depending upon the position of the adjustable tap on voltage divider 244.

The positive pulse is passed through the coupling condenser 241 to the input of the pentode 243. The base line of this pulse is established with respect to a predetermined negative potential by means of a clamping circuit consisting of the rectifier 237 cooperating with the coupling condenser 241 and the resistor 247. The resultant pulse is amplified in the pentode 243 and a resultant output signal is developed across the primary winding of the differentiator transformer 251. The differentiated signal on the output of the differentiator transformer 251 has a positive spike followed by a negative spike corresponding to the leading and trailing edges respectively of the pulse developed across the primary winding of the transformer 251. Because of the action of the rectifier 255, only the positive pulse is applied to the input of the pentode 254 of the cathode follower stage 42.

The cathode follower stage 42 is conventional, the output being taken across the cathode resistor 256 and fed through a suitable video output connection 257 to a utilization circuit and through a coupling condenser 259 to the input of the blocking oscillator section 43. These two outputs correspond to the intelligence pulse of the received pulse group.

The blocking oscillator section 43 is arranged to produce a positive pulse followed by a negative pulse due to the impedance in the circuit, the subsequent oscillations which result in the operation of the triode 260 are sufficiently damped so as to be insignificant and may therefore be disregarded. There is accordingly introduced in a second secondary winding of transformer 261, associated with the input of the triode 265 of the amplifier 44, a negative pulse which will not affect the operation of the amplifier stage 44 since it is already biased negatively, and a positive pulse which is sufficient to cause the triode 265 to become conductive. When the triode 265 becomes conductive the primaries of the transformers 227 and 228 are energized to induce in the secondaries thereof positive pulses which cause the triodes 225 and 226 of the bi-directional switch to be rendered conductive.

When the positive pulses are applied to the control electrodes of the triodes 225 and 226, grid currents flow which are effective to charge the capacitors 229 and 231 associated with the inputs to the triodes 225 and 226. This charge is polarized properly to maintain the triodes 225 and 226 non-conductive for a predetermined period of time after the conduction pulse, the period being determined by the discharge time of the condensers through their associated resistors 230 and 232.

The positive output pulse from amplifier 35 is also fed through a coupling condenser 199 to the input of the pulse stretching stage 36 which includes a clamping circuit consisting of rectifier 202 and resistor 203 cooperating with the coupling condenser 199 so as to establish a fixed base line with respect to ground for the incoming intelligence pulse from the amplifier section 35. The signal is applied to the control electrode of the pentode 200 which is in effect a cathode follower having as a cathode impedance the characteristic impedance of transmission line 206. When a pulse is impressed on the control electrode of the pentode 200, the pulse appears on the left terminal of the transmission line. The pulse is positive and is fed through rectifier 207 to appear across the resistor 211. The pulse is also propagated along the transmission line toward the right, its speed of propagation depending upon the values of the inductances and condensers making up the line. At a first pick-up point the pulse is again fed, through rectifier 208 to appear across resistor 211, and this structure and function may be repeated as often as it is desired: in the drawing one further rectifier 209 is shown, through which the further delayed pulse appearing across terminating resistor 210 is fed to appear across resistor 211. The resulting voltage upon resistor 211 is in effect a series of pulses which appear side by side in time and produce a stretched wave, the individual pulses overlapping sufficiently for the stretched wave to be continuous and relatively constant throughout its stretched length. The stretched pulse is shown in the inset 39 in Figure 1. A more detailed discussion of pulse stretcher 36 is found in a copending application of Merle Ludwig, Serial No. 309,029, filed September 11, 1952, and assigned to the assignee of the present invention.

The stretched pulse on resistor 211 is passed through the coupling condenser 212 to the input of the switch driving stage 40 and the base line is established at a predetermined level by a clamping circuit consisting of the rectifier 215 and the resistor 216 cooperating with the coupling condenser 212. In this instance the base line is established with respect to a predetermined negative potential, which is determined by a voltage divider, between negative supply bus 39 and ground, consisting of resistors 99, 119, and 249, to which the lower end of rectifier 215 is connected. The resultant signal is amplified and appears across the resistor 219 as a negative pulse, which passes through the coupling condenser 220 to the bi-directional switch stage 41. The base line of the pulse at this point is rendered independent of the random signals and noise present in the circuit by means of a further clamping circuit comprising the rectifier 221 and the resistor 222 cooperating with the coupling condenser 220. The level at which the base line is established is determined by an adjustable voltage divider, consisting of resistor 223 and potentiometer 233, which has one end connected to the positive supply bus and the other end connected to ground.

The bi-directional switch stage comprises the triodes 225 and 226, and the stretched negative pulse is applied thereto to determine the charge on capacity 269. This capacity is in effect the interelectrode and other stray capacity that exists between the upper terminal of resistor 270 and ground: in one embodiment of the invention its magnitude was approximately 50 micromicrofarads.

It is desired for the output potential on capacity 269 in the output of the bi-directional switch stage 41 to directly follow the magnitude of the central portion of the stretched pulse as it is applied to the switch. In considering the operation of bi-directional switch 41 it will be remembered that the grids are maintained negative by residual charge in condensers 229 and 230 except during the brief intervals when positive blocking oscillator pulses are applied. These pulses are aligned in time with the fall of the unstretched intelligence pulses from amplifier 35, and hence occur during the midportion of the stretched pulses, after the possibly irregular leading edge has passed and before the fall of the pulse occurs. The occurrence of the blocking oscillator pulses triggers the bi-directional switch triodes to permit them to conduct according to the voltages between their anodes and cathodes: at the end of the blocking oscillator pulse conduction in the switch triodes ceases, and the charge on capacity 269 can disappear only by leakage.

Now suppose that at some instant there is a random positive voltage on capacity 269, and that the pulse supplied through condenser 220 is more positive. When a blocking oscillator pulse occurs capacity 269 charges through triode 225 to the new voltage. If the random positive voltage is greater than the pulse supplied, capacity 269 discharges through the triode 266 to the new voltage. If the random voltage and the pulse supplied are of the same, no change occurs.

The voltage on capacity 269 is applied to the cathode follower stage 45 on the input of the triode 271. The triode 271 conducts in accordance with this potential and the output voltage appearing across the cathode resistor 272 is applied to a filter section which includes the resistors 276, 277, and the condenser 278. The filter section acts to average the voltages existing on the input of the triode 271 and, when properly designed, gives an output which follows the changes in amplitude of the incoming signal after a proper delay period.

The output of the filter section is limited by the diode connected triode 275 and is applied through resistors 279 and 280 to the input of a further cathode follower stage 46 consisting of two triodes, 281 and 282, connected in parallel whose cathodes are connected to the negative supply buss 59 through the resistor 283 and whose anodes are connected to the positive supply buss 49. The output from cathode follower stage 46 is taken across resistor 283 and is connected to the automatic gain control line 15, and the potential thereof establishes the potential applied to the intermediate frequency amplifier section 14 and tends to compensate for changes in the magnitude of the received signal, so that the video output pulses appearing at video output connection 257 have essentially constant magnitudes.

A more detailed discussion of the automatic gain control circuit including elements 36, 37, 40, 41, 42, 43, 44, 45 and 46 will be found in the copending Walter application, Serial No. 309,025, filed September 11, 1952, and assigned to the assignee of the present application.

From the foregoing it will be seen that there has been provided a new and improved pulse type receiver wherein special noise eliminating circuits have been incorporated to improve the operation of the over-all apparatus as well as the automatic gain control portion thereof. It will be seen that the effects of noise have been eliminated in the automatic gain control circuits and the decoding circuits by the use of gating signals which occur only during the time of occurrence of an intelligence pulse or the coding pulses, and that where it is impossible to completely eliminate the noise or spurious signals, the effects of the signals have been eliminated by the utilization of limiting and clamping circuits to maintain predetermined set base lines for the pulses after they have been passed through coupling condensers between amplifying stages or control stages. It will also be seen that there has been provided special synchronizing means for locking the operation of an asynchronous multi-vibrator associated with the coding pulse decoder so as to further aid any noise elimination characteristics of the present apparatus. While many modifications will be obvious to those skilled in the art, it is intended that the scope of the application be limited solely by the appended claims.

I claim as my invention:

1. A noise reduction apparatus for use with a source of input signal voltage comprising a pair of coding pulses followed by an intelligence pulse forming together a group of pulses which recurs at a predetermined frequency, said apparatus comprising: a gated amplifier having a first and a second input and an output; means for connecting said first input to receive the input signal voltage; an asynchronous multivibrator having an output signal voltage of a frequency different from said first mentioned predetermined frequency; means for connecting the output of said multivibrator to said second input so that said gated amplifier supplies an output signal when there are concurrent signal voltages on said first and second inputs; decoding means connected to said output of said gated amplifier, said last named means being rendered operative upon the appearance of said pair of coding pulses at said output of said gated amplifier; and synchronizing means actuated by the operation of said decoding means for locking the frequency of said multivibrator to said predetermined frequency.

2. A noise reduction apparatus for use with a source of input signal voltage comprising a pair of coding pulses forming together a pulse group which recurs at a predetermined frequency, said apparatus comprising: a gated amplifier having a first and second input and an output; means for connecting said first input to receive said input signal; an asynchronous multivibrator having an output signal voltage of a frequency different from said predetermined frequency; means for connecting said output signal voltage of said multivibrator to said second input so that said pulse group appears at said output of said gated amplifier when the signal voltages on said first and second inputs are concurrent; circuit means connected to said output of said gated amplifier for delaying the first coding pulse of said pair of coding pulses to coincide with the second coding pulse of said pair of coding pulses; control means operative upon the coincidence of said coding pulses; and synchronizing means actuated by the operation of said control means for locking the frequency of said multivibrator to said predetermined frequency.

3. A noise reduction apparatus for use with a source of input signal voltage comprising a pair of coding pulses forming a pulse group which recurs at a predetermined frequency, said apparatus comprising: a gated amplifier having a first and a second input and an output; means for connecting said first input to receive the input signal; an asynchronous multivibrator having an output signal voltage of a frequency different from said predetermined frequency; means for connecting said output signal voltage from said multivibrator to said second input so that the pulse group appears at said output of said gated amplifier when said signals on said first and second inputs are concurrent; circuit means connected to the output of said gated amplifier for delaying the first coding pulse of said pulse group to coincide with the second coding pulse of said pulse group; an electronic discharge device having a control electrode, a cathode and an output circuit; further circuit means for energizing said control electrode with said delayed coding pulse and for energizing said cathode with said second coding pulse to render said discharge device operative upon the coincidence of said coding pulses; and synchronizing means actuated by the operation of said discharge device for locking the frequency of said multivibrator to said predetermined frequency.

4. Apparatus of the class described comprising in combination: a source of signal voltage comprising a pair of coding pulses forming together a pulse group recurring at a predetermined frequency; a source of gating voltage out of synchronization with said predetermined frequency; a gating circuit having a first and a second input; circuit means for connecting said signal voltage to said first input and said gating voltage to said second input to produce an output voltage from said gating circuit when said signal voltage and said gating voltage occur on said inputs at the same time, said output voltage comprising said pair of coding pulses; delay means energized by said output voltage for delaying the first pulse of said pair of coding pulses to coincide with the second pulse of said pair of coding pulses; an electronic discharge device energized by said pair of coding pulses, said discharge device being rendered operative upon the coincidence of said pair of coding pulses; and synchronization means actuated by the operation of said discharge device for synchronizing said source of gating voltage to said predetermined frequency.

5. Apparatus of the class described comprising in combination: a source of signal voltage of a predetermined frequency; a first and a second gating circuit, said circuits being normally inoperative; a first source of gating voltage having a frequency different from said predetermined frequency; a second source of gating voltage being normally inoperative and having an operative frequency equal to said predetermined frequency; circuit means for connecting said signal voltage and said first gating voltage to said first gating circuit, said first gating circuit producing an output voltage when said signal voltage and said first gating voltage are of the same relative phase relationship; circuit means responsive to said output voltage for synchronizing said first source of gating voltage to said predetermined frequency and for initiating the operation of said second source of gating voltage; and circuit means for energizing said second gating circuit with said signal voltage and said second gating voltage, said second gating circuit producing an output voltage comprising a desired portion of said signal voltage.

6. Apparatus of the class described comprising in combination: a source of signal voltage comprising a pair of coding pulses followed by an intelligence pulse forming together a pulse group recurring at a predetermined frequency; a first source of gating voltage having a frequency different from said predetermined frequency; a first gating circuit having a first and a second input; circuit means for energizing said first input of said first gating circuit with said signal voltage and for energizing said second input of said first gating circuit with said first gating voltage, said first gating circuit producing an output voltage when said signal voltage and said first gating voltage are of the same relative phase relationship; decoding means energized by said output voltage of said first gating circuit for producing a synchronizing pulse; circuit means energized by said synchronizing pulse for synchronizing said first source of gating voltage to said predetermined frequency; a second source of gating voltage energized by said synchronizing pulse; a second gating circuit having a first and a second input; and circuit means for energizing said first input of said second gating circuit with said signal voltage and for energizing said second input of said second gating circuit with said second gating voltage, said second gating circuit producing an output voltage comprising a desired portion of said signal voltage when said signal voltage and said second gating voltage are of the same relative phase relationship.

7. Apparatus of the class described comprising in combination: a source of signal voltage comprising a pair of coding pulses followed by an intelligence pulse forming together a pulse group recurring at a predetermined frequency; a first source of gating voltage having a normal frequency different from said predetermined frequency; a first gating circuit having a first and a second input; circuit means for energizing said first input of said first gating circuit with said signal voltage and for energizing said second input of said first gating circuit with said first gating voltage, said first gating circuit producing an output voltage when said signal voltage and said first gating voltage are of the same relative phase relationship; delay means for delaying the first pulse of said pair of coding pulses to coincide with said second pulse of said pair of coding pulses; decoding means energized by said delay means for producing a synchronizing pulse upon the coincidence of said coding pulses; circuit means energized by said synchronizing pulse for synchronizing said first source of gating voltage to said predetermined frequency a second source of gating voltage energized by said synchronizing pulse; a second gating circuit having a first and a second input; and circuit means for energizing said first input of said second gating circuit with said signal voltage and for energizing said second input of said second gating circuit with said second gating voltage, said second gating circuit producing an output voltage when said second voltage and said second gating voltage are of the same relative phase relationship.

8. Apparatus of the class described comprising in combination: a source of signal voltage comprising a pair of coding pulses followed by an intelligence pulse forming together a pulse group recurring at a predetermined frequency; a first source of gating voltage having a frequency different from said predetermined frequency; a first gating circuit having a first and a second input; circuit means for energizing said first input of said first gating circuit with said signal voltage and for energizing said second input of said first gating circuit with said first gating voltage; said first gating circuit producing an output voltage when said signal voltage and said first gating voltage are of the same relative phase relationship; decoding means energized by said output voltage of said first gating circuit for producing a synchronizing pulse; circuit means energized by said synchronizing pulse for synchronizing said first source of gating voltage to said predetermined frequency; a second source of gating voltage energized by said synchronizing pulse; a second gating circuit having a first and a second input; circuit means for energizing said first input of said second gating circuit with said signal voltage and for energizing said second input of said second gating circuit with said second gating voltage, said second gating circuit producing an output voltage when said signal voltage and said second gating voltage are of the same relative phase relationship; and delay means for delaying said synchronizing pulse energizing said second source of gating voltage so that said output voltage of said second gating circuit consists of only said intelligence pulse.

9. Apparatus of the class described comprising in combination: a source of signal voltage comprising a pair of coding pulses followed by an intelligence pulse forming together a pulse group recurring at a predetermined frequency; a first source of gating voltage having a normal frequency different from said predetermined frequency; a first gating circuit having a first and a second input; circuit means for energizing said first input of said first gating circuit with said signal voltage and for energizing said second input of said first gating circuit with said first gating voltage, said first gating circuit producing an output voltage when said signal voltage and said first gating voltage are of the same relative phase relationship; a first delay means for delaying the first pulse of said pair of coding pulses to coincide with said second pulse of said pair of coding pulses; decoding means energized by said first delay means for producing a synchronizing pulse upon the coincidence of said coding pulses; circuit means energized by said synchronizing pulse for synchronizing said first source of gating voltage to said predetermined frequency said normal frequency of said first source of gating voltage being sufficiently close to said predetermined frequency for said first source of gating voltage to remain essentially synchronized with said predetermined frequency during an absence of said signal voltage for at least three consecutive cycles; a second source of gating voltage energized by said synchronizing pulse; a second gating circuit having a first and a second input; circuit means for energizing said first input of said second gating circuit with said signal voltage and for energizing said second input of said second gating circuit producing an output voltage when said second voltage and said second gating voltage are of the same relative phase relationship; and a second delay means for delaying said synchronizing pulse energizing said second source of gating voltage so that said output voltage of said second gating circuit consists of only said intelligence pulse.

10. Apparatus of the class described comprising in combination: a source of signal voltage of a predetermined frequency; a source of gating voltage having a normal frequency lower than said predetermined frequency; a gating circuit having a first and a second input; circuit means for connecting said signal voltage to said first input and for connecting said gating voltage to said second input to produce an output voltage from said gating circuit when said gating voltage occurs at the same time as said signal voltage; and synchronizing means being responsive to said output voltage from said gating circuit for synchronizing said source of gating voltage to said predetermined frequency.

11. Apparatus of the class described comprising in combination; a source of signal voltage having a predetermined frequency; a source of gating voltage having a lower frequency than said predetermined frequency; a gating circuit having a first and a second input; circuit means for connecting said signal voltage to said first input and said gating voltage to said second input to produce an output voltage from said gating circuit when said signal voltage and said gating voltage are of the same relative phase relationship; and synchronizing means being responsive to said output voltage for synchronizing said lower frequency of said source of gating voltage to said predetermined frequency, said lower frequency being sufficiently close to said predetermined frequency for said source of gating voltage to produce a gating voltage having essentially the same relative phase relation as said signal voltage during an absence of said signal voltage for at least three consecutive cycles before synchronization of said source of gating voltage must again take place.

12. Noise reduction apparatus comprising in combination: a source of signal voltage comprising a pair of coding pulses forming together at pulse group, said source of signal voltage having a predetermined period; a gated amplifier having a first and a second input and an output; means for connecting said signal voltage to said first input; an asynchronous multivibrator having an output voltage with a normal period longer than said predetermined period; means for connecting said output voltage of said multivibrator to said second input so that said pulse group appears at said output of said gated amplifier when said voltages on said first and second inputs are concurrent; delay means connected to said output of said gated amplifier for delaying the first coding pulse of said pair of coding pulses to coincide with the second coding pulse of said pair of coding pulses; and decoding means connected to said delay means, said decoding means being operative upon the coincidence of said coding pulses to shorten the period of said multivibrator to coincide with said predetermined period.

13. Apparatus of the class described comprising in combination: a source of signal voltage comprising a pair of coding pulses forming together a pulse group, said source of signal voltage having a predetermined period; a source of gating voltage having a gating pulse type output with a longer period than said predetermined period, said gating pulse having a longer duration than said pulse group; a gating circuit having a first and a second input; circuit means for connecting said signal voltage to said first input and for connecting said gating voltage to said second input, to produce an output voltage from said gating circuit when said pulse group and said gating pulse are concurrent on said inputs, said output voltage comprising said pair of coding pulses; delay means energized by said output voltage of said gating circuit for delaying the first pulse of said pair of coding pulses to coincide with the second pulse of said pair of coding pulses; decoding means energized by said pair of coding pulses, said decoding means being rendered operative upon the coincidence of said delayed coding pulse with said second coding pulse; and means actuated by the operation of said decoding means for shortening the period of said source of gating voltage to said predetermined period.

14. Apparatus of the class described comprising in combination: a source of signal voltage having a predetermined period; a first and a second gating circuit said circuits being normally inoperative; a first source of gating voltage having period longer than said predetermined period; a second source of gating voltage being normally inoperative and having an operative period equal to said predetermined period; circuit means for connecting said signal voltage and said first gating voltage to said first gating circuit, said first gating circuit producing an output voltage when said signal voltage and said first gating voltage are of the same relative phase relationship; circuit means responsive to said output voltage for chopping said longer period of said first source of gating voltage to said predetermined period and for initiating the operation of said second source of gating voltage; and circuit means for energizing said second gating circuit with said signal voltage and said second gating voltage, said second gating circuit producing an output voltage comprising a desired portion of said signal voltage.

15. Apparatus of the class described comprising in combination: a source of signal voltage comprising a pair of coding pulses followed by an intelligence pulse forming together a pulse group recurring at a predetermined frequency; a first source of gating voltage with a pplse type output having a normal frequency lower than said predetermined frequency, said gating pulse having a duration longer than said signal puse group; a first gating circuit having a first and a second input; circuit means for energizing said first input of said first gating circuit with said signal pulse group and for energizing said second input of said first gating circuit with said first gating pulse, said first gating circuit producing an output voltage comprising said pair of coding pulses when said signal pulse group and said gating pulse occur at the same time; delay means energized by said output voltage of said first gating circuit for delaying the first pulse of said pair of coding pulses to coincide with the second pulse of said pair of coding pulses; decoding means energized by said delay means for producing a synchronizing pulse upon the coincidence of said coding pulses; circuit means energized by said synchronizing pulse for synchronizing said first source of gating voltage to said predetermined frequency, said first gating pulse having a sufficiently long duration with respect to the duration of said signal pulse group so that said signal pulse group may recur within the duration of first gating pulse for at least three consecutive cycles in the absence of said synchronizing pulse; a second source of gating voltage with a pulse type output recurring at said predetermined frequency energized by said synchronizing pulse; a second gating circuit have a first and a second input; and circuit means for energizing said first input of said second gating circuit with said signal pulse group and for energizing said second input of said second gating circuit with said second gating voltage, said second gating circuit producing an output comprising a desired portion of said signal pulse group.

16. Noise reduction apparatus comprising in combination; a source of signal voltage having a predetermined period, said signal voltage comprising a pair of coding pulses followed by an intelligence pulse forming together a pulse group; a normally inoperative source of gating voltage having a period equal to said predetermined period; decoding means energized by said pair of coding pulses, said decoding means producing an output pulse; means connecting said output pulse to said source of gating voltage for initiating the operation of said source, said last named means including delay means to cause said gating voltage to coincide in time with said intelligence pulse; and gating means energized by said signal voltage and said gating voltage for reproducing said intelligence pulse.

17. Apparatus of the class described comprising in combination: a source of signal voltage including a train of pulse groups recurring at a predetermined repetition frequency, each said group comprising at least one coding and one intelligence pulse; a device to be controlled in accordance with the intelligence pulses in said train; gating means connected between said source and said device and having a normal condition, in which said signal voltage is prevented from reaching said device, and an energized condition, in which said signal voltage is not so prevented; decoding means connected to said source for supplying an output signal determined by said coding pulse; means connected to said decoding means for deriving from said output signal a gating pulse beginning before said intelligence pulse and continuing through an interval sufficient to include said intelligence pulse; and means interconnecting said last named means and said gating means for energizing the latter with said gating pulse, whereby said device is energized with only the intelligence pulses of said signal voltage.

18. Apparatus of the class described comprising, in combination: a source of signal voltage having a predetermined period; a source of gating voltage having a period longer than the period of said signal voltage; a gating circuit adapted to be energized with said voltages for supplying an output when said voltages are simultaneously supplies thereto; means energizable to shorten the period of said gating voltage; and means connecting said last named means for energization with said output, so that said gating voltage source automatically comes into and remains in synchronization with said signal voltage source.

19. Apparatus of the class described comprising, in combination: a source of signal voltage comprising a group of pulses recurring with a predetermined period and extending over a predetermined interval within said period; a source of gating voltage comprising a pulse recurring with a period longer than the period of said signal voltage and extending over an interval which is greater than the interval of said pulse group; a gating circuit having first and second inputs and an output and adapted, when said second input is energized, to give an output determined by said first input; means connecting said sources to said first and second inputs respectively of said gating circuit; synchronizing means energizable to vary the period of said gating voltage; and means connecting said synchronizing means to the output of said gating circuit for energization thereby, so that said second source is normally synchronized to said signal source; the difference between said periods being so selected with respect to the relative lengths of said intervals that in the event of the imperfect transmission of said pulse groups to said gating circuit synchronization is maintained as long as at least one pulse group out of each three is supplied by said first named source to said gating circuit, and so that upon more extended interruption of transmission of signals from said signal source, said gating signal source automatically resynchronizes with said signal source when signals therefrom are again transmitted.

References Cited in the file of this patent

UNITED STATES PATENTS

| | | |
|---|---|---|
| 2,294,341 | Moore | Aug. 25, 1942 |
| 2,419,570 | Labin | Apr. 29, 1947 |
| 2,430,139 | Peterson | Nov. 4, 1947 |
| 2,524,691 | Bliss | Oct. 3, 1950 |
| 2,534,746 | Wells | Dec. 19, 1950 |